(12) United States Patent
Ladanyi et al.

(10) Patent No.: US 9,282,665 B1
(45) Date of Patent: Mar. 8, 2016

(54) ILLUMINATED DOORBELL CHIME SYSTEM

(71) Applicant: LITEX INDUSTRIES, LIMITED, Grand Prairie, TX (US)

(72) Inventors: Donald J Ladanyi, Westlake, OH (US); Georgios V Lazaridis, Piraeus (GR)

(73) Assignee: LITEX INDUSTRIES, LIMITED, Grand Prairie, TX (US)

( * ) Notice: Subject to any disclaimer, the term of this patent is extended or adjusted under 35 U.S.C. 154(b) by 72 days.

(21) Appl. No.: 14/154,174

(22) Filed: Jan. 13, 2014

(51) Int. Cl.
*H01H 13/02* (2006.01)
*H05K 7/00* (2006.01)

(52) U.S. Cl.
CPC ....................................... *H05K 7/00* (2013.01)

(58) Field of Classification Search
CPC .............. G08B 3/00; G08B 3/10; H01H 9/08; H01H 13/023
USPC ......................... 340/932.2, 692, 326; 200/310
See application file for complete search history.

(56) References Cited

U.S. PATENT DOCUMENTS

| | | | | |
|---|---|---|---|---|
| 7,180,021 | B2 * | 2/2007 | Birdwell et al. | 200/310 |
| 7,477,134 | B2 * | 1/2009 | Langer et al. | 340/326 |
| 2004/0095254 | A1 * | 5/2004 | Maruszczak | 340/692 |
| 2011/0090068 | A1 * | 4/2011 | Langer et al. | 340/333 |
| 2011/0187551 | A1 * | 8/2011 | Arrotta | 340/815.45 |

* cited by examiner

*Primary Examiner* — Albert Wong
(74) *Attorney, Agent, or Firm* — Mark W. Handley; Handley Law Firm, PLLC

(57) ABSTRACT

An illuminated doorbell chime system is disclosed having a chime coil and LED lights. A chime control circuit has a power supply unit, an LED driver and a chime driver. The power supply unit is connected to the LED lights and the chime coil. The LED driver is connected to the LED lights. The chime driver is connected to the chime coil. A door switch selectively applies power to the power supply unit. The LED driver has a bipolar junction transistor, a base Zener diode, and a voltage divider. The chime driver has a Mosfet transistor, a gate resistor, a gate capacitor, and a gate Zener diode. The LED driver and the chime driver are interconnected, with a cathode of the gate Zener diode connected to the collector of the bipolar junction transistor, and a cathode of the base Zener diode connected to the drain of the Mosfet transistor.

19 Claims, 2 Drawing Sheets

ILLUMINATED DOORBELL CHIME SYSTEM

TECHNICAL FIELD OF THE INVENTION

The present invention relates in general to doorbell chimes, and in particular to a doorbell chime having a solid state chime driver and an LED driver.

BACKGROUND OF THE INVENTION

Prior are doorbell chimes have been provided using discrete components to provide relays an switching circuits for controlling the doorbell chimes. Some doorbell chimes have been provided with illuminated chime housings also using discrete components. Typically, a control voltage is applied to a doorbell push button switch. Actuating the push button switch applies power to a chime coil which rings the chime. Relay circuits have also been used to apply a control voltage to a relay which results on a power voltage being applied to ring the chime.

SUMMARY OF THE INVENTION

A novel illuminated doorbell chime system is disclosed having a chime coil and one or more LED lights. The LED lights are connected in parallel with balancing resistors connected in series to respective ones of the LED lights. The chime control circuit is provided having a power supply unit, an LED driver and a chime driver. The power supply unit is connected to the LED lights and the chime coil. The LED driver is connected between the LED lights a common ground plane. The chime driver is between the chime coil and the common ground plane. A door switch is connected between an AC power supply and the power supply unit of the control circuit for selectively applying power to the power supply unit.

The LED driver circuit has a bipolar junction transistor, a base Zener diode, and a voltage divider. A collector of the bipolar junction transistor is connected to the LED lights. An emitter of the bipolar junction transistor is connect to the common ground plane through a current limiting resistor. A base of the bipolar junction transistor is connected to a voltage output of the voltage divider. The voltage divider has a high end connected to a cathode of the base Zener diode. The voltage divider also has a low end connected to the common ground plane. An anode of the base Zener diode connected to the common ground plane. The chime driver has a Mosfet transistor, a gate resistor, a gate capacitor, and a gate Zener diode. The gate Zener diode is connected in series with a resistor. A drain of the Mosfet transistor is connected to the chime coil and the base diode of the LED driver circuit. A gate of the Mosfet transistor is connected to the gate transistor, the gate storage capacitor and an anode of the gate Zener diode. The gate resistor, the gate storage capacitor, and the source of the Mosfet transistor are connected to the common ground plane.

The LED driver and the chime driver are interconnected, with a cathode of the gate Zener diode connected to the collector of the bipolar junction transistor, and a cathode of the base Zener diode connected to the drain of the Mosfet transistor. Activating the door switch applies supply voltage to the chime coil and the gate of the Mosfet transistor which passes a chime operating current through the chime coil and the Mosfet transistor, and reduces the voltage applied to the base of the bipolar junction transistor to turn off the LED lights.

DESCRIPTION OF THE DRAWINGS

For a more complete understanding of the present invention and the advantages thereof, reference is now made to the following description taken in conjunction with the accompanying Drawings in which

FIG. 1 is a front, elevation view of an illuminated doorbell chime; and

FIG. 2 is schematic diagram showing the circuit for the front door portion of the illuminated chime.

DETAILED DESCRIPTION OF THE INVENTION

Figure 1:
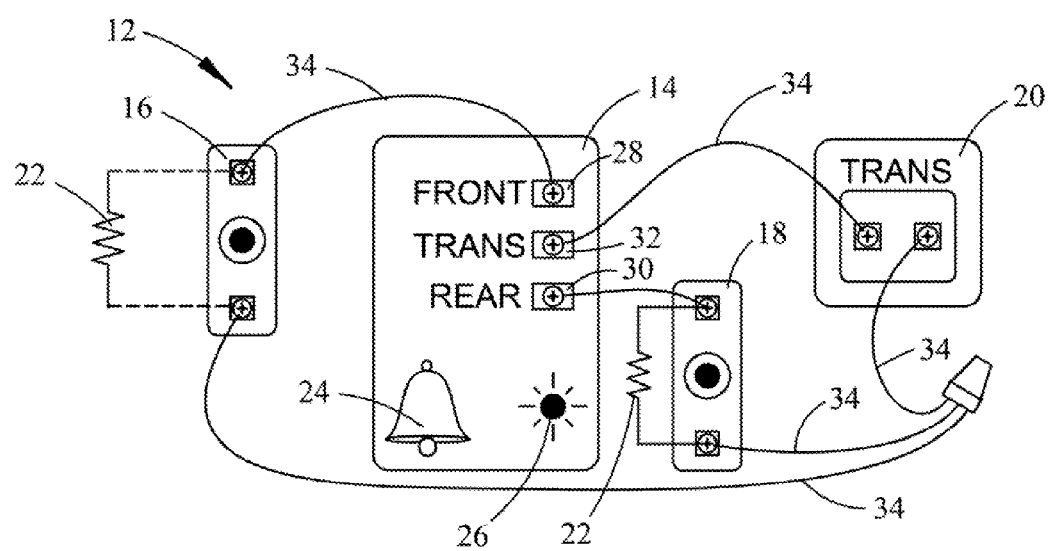
FIGS. 1 and 2 show various aspects for an illuminated doorbell chime system made according to the present invention, as set forth below.

FIG. 1 is a schematic diagram of an illuminated doorbell chime 12. The doorbell chime 12 has a circuit board 14, a front door switch 16, a rear door switch 18, and a main power supply provided by a transformer 20. The transformer 20 preferably provides AC power. The switches 16 and 18 are preferably provided by illuminated door pushbutton switches which are normally open, and when disposed in the normally open state provide a small quiescent current for powering LED lights 26. Power resistors 22 may also be connected in parallel across the switches 16 and 18 to provide additional power to the quiescent current of the switches 16 and 18 should the additional power be required for the LED lights 26. The power resistors 22 are optional. If provided, preferably each of the power resistors 22 are rated three hundred and ninety ohms and two watts. The circuit board 14 has a front door contact terminal 28, a rear door contact terminal 30, and a power terminal 32. Preferably, two independent circuits are provided for an illuminated front chime and an illuminated rear chime. Only one chime 24 and one LED light source 26 are shown. The power terminal 32 is connected to a first terminal of the transformer 30. The contact terminals 28 and 30 are connected to first contacts of the front door switch 16 and the rear door switch 18, respectively. Wiring 34 electrically connects the various components of the doorbell chime 12 together, and includes a common wiring circuit connecting second contacts of the switches 16 and 18 to a second terminal of the transformer 20.

The LED light source 26 is preferably provided by eight LEDs connected in parallel. These LEDs equally share the quiescence current from the illuminated pushbutton 16 when it is not pressed. Different pushbuttons have different quiescence current which primarily depends on the type of the light source that the pushbuttons contain. Pushbuttons with incandescent light bulbs usually provide enough current to brightly illuminate all eight LEDs. Some modem pushbuttons equipped with LEDs as the light source are configured to operate at lower currents. This current is sometimes not enough to brightly illuminate all eight LEDs in the chime box to a satisfactory level. The resistors 22 are connected in parallel to the pushbutton switches 16 and 18 in such instances. Preferably the resistance of the resistors 22 and 24 are selected such that the resulting current from the parallel circuit of one of the resistors 22 and the corresponding one of the push button switches 16 and 18 will be no less than 45 mA, which is sufficient to brightly illuminate the eight LEDs in the chime box. The power rating for the resistors 22 and 24 much also be selected to withstand the maximum power in al known LED pushbutton instances.

Figure 2:
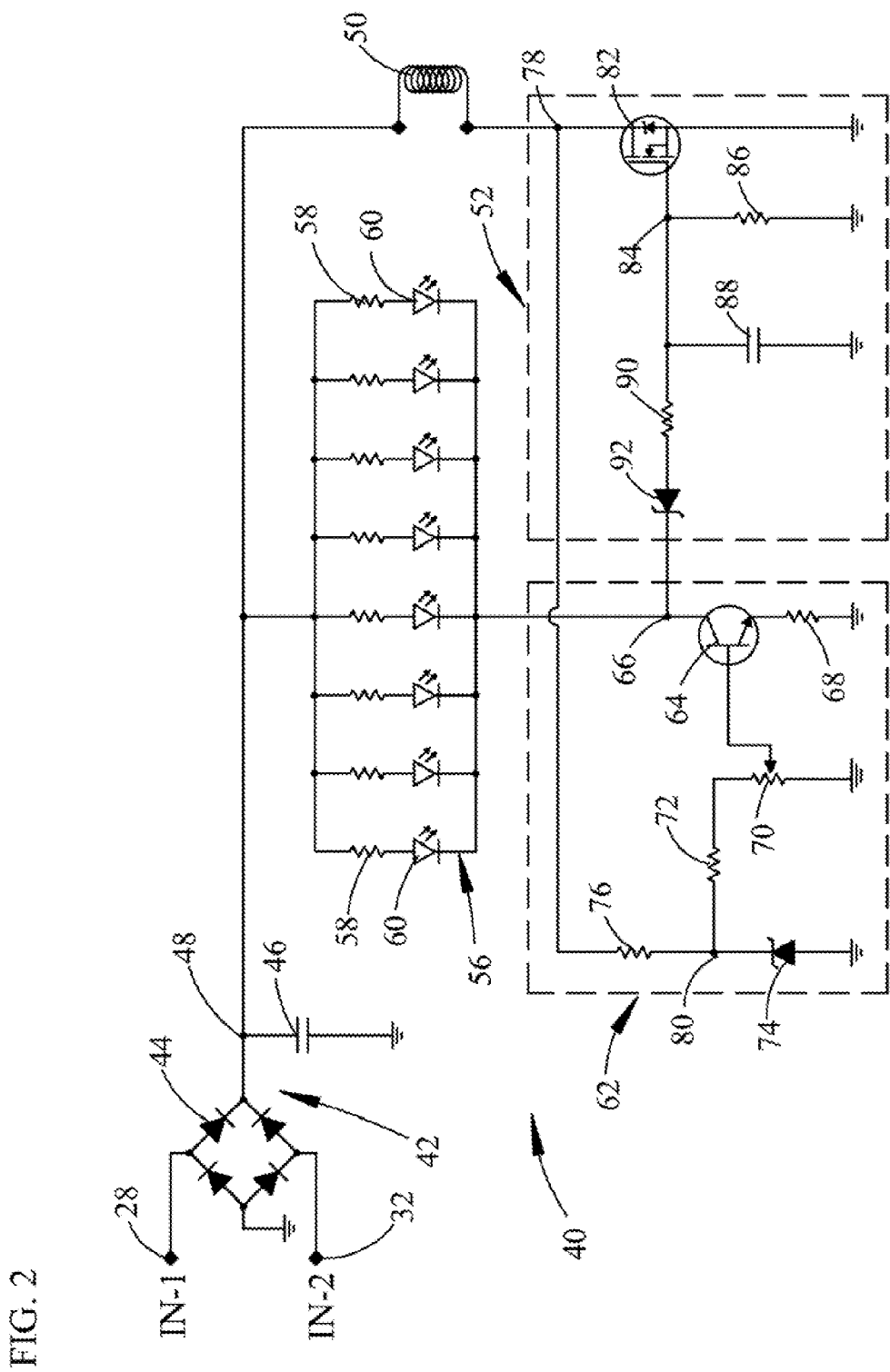

FIG. 2 is schematic diagram showing the chime control circuit 40 for the front door portion of the illuminated chime 12. A separate and independent circuit is preferably provided for the rear door chime which is identical to the chime control circuit 40 shown. Input terminals are provided which correspond to the terminal contacts 28 and 32 in FIG. 1. The front door illuminated chime circuit includes a power supply unit 42, a chime coil 50, a chime driver circuit 52, an LED light array 56, and an LED driver circuit 62.

The power supply unit 42 is provided by a rectifier 44 and a filter 46. The rectifier 44 is preferably provided by a conventional bridge rectifier. The filter 46 is preferably provided by a capacitor which smooths the output of the rectifier 44. AC or DC voltage is applied by the transformer 20 and the front door pushbutton 16, which is rectified by the full-waveform bridge rectifier 44 and smoothed with a capacitor 46. The output of the rectifier 44 is defined by a node 48 which is connected to the filter 46, the LED light array 56, and the chime coil 50. The chime coil 50 connects between the node 48 and a node 78. The LED light array 56 preferably comprises eight individual LEDs 60 and eight balancing resistors 58. Each of the LEDs 60 is connected in series with one of the balancing resistors 58, and then each pair of the series connected LEDs 60 and the balancing resistors 58 are connected in parallel to the others of the LEDs 60 and balancing resistors 58, between the node 48 and a node 66. The balancing resistors 58 balance the current through each of the eight LED parallel branches.

The LED driver circuit 62 has a first solid state switch provide by a bipolar junction transistor 64. The transistor 64 provides a single transistor, constant current driver 62 and controls the brightness of the LEDs. The collector of the transistor 64 is connected to the node 66. A resistor 68 connects between the emitter of the transistor 64 and ground, and provides a current limiting resistor. The base of the transistor 64 is connected to a potentiometer 70, which is connected as a voltage divider. The potentiometer 70 provides an LED dimmer function. The brightness of the LEDs 60 is controlled by adjusting the potentiometer 70. The brightness of the LEDs 60 is proportional to their current. A resistor 72 connects between the potentiometer 70 and a node 80, which is connected to a voltage regulator 74 provided by a Zener diode. The other end of the regulator 74 is connected to ground. A resistor 76 connects between the node 80 and the node 78, which is connected to one side of the chime coil 50.

The driver 62 is set to allow a maximum of 100 mA through the eight LEDs 60 connected in parallel, so that each of the LEDs 60 may accept a maximum current of 12.5 mA. This is a solid state solution to utilize all the quiescence current coming from the pushbutton 16 (usually much less than 50 mA), without endangering the LEDs 60. Current spikes due to a press of the pushbutton 16 cannot exceed this limit as well due to the effectiveness and the very fast reaction speed of the transistor 64. This way the lifespan of the LEDs 60 is maintained to a maximum. An LED dimmer is provided by a variable resistor, or potentiometer, 70. The LED dimmer has a control voltage regulated by a Zener diode 74 which provides a voltage regulator with a voltage of 3.3 volts. This voltage is kept low to allow proper regulation even at low supply voltage from the switch 16. The source of this voltage comes from the high-side or Drain of the Mosfet switch 82. This means that the control voltage exists only as long as the Mosfet switch 82 is turned off—that is only as long as the front pushbutton 16 is not pressed. A conventional LED driver circuit would normally require a transistor able to dissipate 2.5 watts of power during a button press. During quiescence (no button press), depending on the pushbutton current, the constant power dissipation could climb up to 700 mW. This would require a transistor with a larger package.

The transistor 64 controls the LED current by changing its base voltage in respect to the regulated reference voltage using the potentiometer 70 connected as a voltage divider. The reference voltage is taken from the drain of the Mosfet switch 82, at the node 78. As long as the pushbutton 16 is not pressed, all the supplied DC voltage appears at the drain of the Mosfet which is enough to be regulated by the Zener regulator 74. When the pushbutton 16 is pressed, the voltage at the drain of the Mosfet transistor 82 equals the loss of the Mosfet transistor 82, which is typically less than one volt. Therefore, the base voltage of the transistor 64 is limited to a few hundred millivolts, and practically the LEDs are turned OFF. This way, during a press of the pushbutton 16, there is virtually no power wasted on the LEDs 60 and the balancing resistors 58, allowing the Mosfet transistor 82 to provide maximum current through the chime coil 50 for a louder sound.

The chime driver circuit 52 has a circuit switch provided by an N-channel Mosfet transistor 82. The drain of the Mosfet transistor 82 is connected to the node 78 and one side of the chime coil 50. The source of the Mosfet transistor 82 is connected to ground. The gate of the Mosfet transistor 82 is connected to a node 84. The node 84 is connected to a gate resistor 86, which is connected on the other end to ground. A capacitor 88 also connects between the node 84 and ground. A resistor 90 connects between the node 84 and the anode of a Zener diode 92. The cathode of the Zener diode 92 is connected to the node 66, which is connected to the collector of the transistor 64. The Mosfet transistor 82 is a solid state switch which is driven by voltage. When current drawn by the Mosfet, when OFF, it is practically zero (in the scale of nanoamperes), allowing a maximum of the quiescent current to flow through the LEDs 60 to achieve a maximum brightness.

The chime driver circuit 52 and the LED driver circuit 62 are thus interconnected. The transistor 64 provides an LED switch which controls when illumination is provided by the LED's 60. The Mosfet transistor 82 provides a chime switch which controls when the chime bell sounds. Both circuits get power from the front door pushbutton 16. These circuits 52 and 62 are not controlled by the main voltage applied to the door chime circuit, as is typical in the prior art, but rather each are controlled by voltages applied to the other of the drive circuits 52 and 62. The LED driver 62 gets its control voltage from the Mosfet transistor 82, and the Mosfet transistor 82 gets its control voltage from the voltage generated on the LED dimmer transistor 64 and applied through the Zener diode 92.

When the button is not pressed, the majority of the power flows through the dimmer LED driver circuit 62. The voltage across the LED driver 62 is minimum while the voltage across the Mosfet transistor 82 is maximum. Any excess of power above that to light the LEDs 60 to a desired level will primarily be dissipated as heat from the transistor 64. If the excess of power exceeds a certain level that could potentially damage the LED driver circuit 62 or the printed circuit board 14, the voltage increases across the transistor 64. When this voltage becomes higher than the breakdown voltage for the Zener diode 92, the Mosfet transistor 82 is driven to the linear area and a voltage drop will be generated across the Mosfet gate resistor 86 allowing part of the excess current to flow through the chime coil 50 of the front doorbell solenoid to balance the power and dissipate heat. This current flow appears as spikes, which are very low in magnitude so as not to cause any movement or acoustic "buzz" on the solenoid. The voltage applied to the collector of the bipolar junction transistor 64 will fall again, maintaining the system into equilibrium. This way, the transistor 64 is not called to dissipate high amounts of power at any time. Also, the designed excess current dissipation through the chime coil 50 allows the use of a smaller transistor 64 for the LED driver/dimmer circuit 62.

When the pushbutton is pressed, the voltage at the collector of the transistor 64 increases way above breakdown voltage of the Zener diode 92. The voltage drop across the gate resistor 86 becomes higher than the threshold for gate of the Mosfet transistor 82, switching on the Mosfet 82. Then, maximum current will flow through the Mosfet transistor 82 and the chime coil 50 actuating the solenoid and the plunger for the chime 24. The voltage across the LED driver climbs to maximum, switching ON the Mosfet switch (which actuates the solenoid). The same time, when the Mosfet switch is actuated, the voltage across it becomes minimum, dropping the high-side of the Mosfet switch to nearly zero, which results in turning off the LED driver, further increasing the voltage across this LED driver. The control voltage of the LED driver drops to nearly zero, practically turning OFF the LEDs. Having the LED driver turned OFF, there is virtually no current consumed by the driver or the LEDs. All the provided current from the transformer is provided to the front solenoid to maximize pulling force on the plunger. Additionally, this practice protects the driver transistor from excessive power dissipation due to the higher voltage provided. This feature allows the use of a smaller transistor even for higher supply voltages. Finally, with the dimmer control voltage running that low along with the dimmer control current in the scale of micro-amperes, the described circuit allows the use of an extra small trimmer in terms of size and power, regardless of the supplied voltage. This feature also further increases the LED brightness since the overall current drawn by the dimmer varies from 250 to 1,500 micro amperes depending on the supplied voltage.

The present invention provides advantages decreasing power over the LED driver when the button is pressed and the chime is sounded. A button press increases significantly the excess of power on the LED driver dimmer. The Mosfet switch senses this incremental increase in power and immediately turns ON to allow all the power to flow through the chime bell and produce a strong chime sound. On the other hand, the dimmer circuit senses the state of the Mosfet switch and turns OFF completely. This way, circuit interaction ("circuit flipping) achieves three goals: First, the dimmer is protected from the huge power that would be otherwise called to dissipate when the button is pressed. Second, the LEDs shut OFF to provide a visual feedback of a button press. Third, there is practically no power consumed on any other part of the circuit (LEDs or dimmer), so the power delivered to the chime bell is therefore maximized; delivering the greatest strike force possible to the plunger, and thus the loudest sound level possible.

The circuit flipping described above is not absolute ON-OFF but there is a linear area in between. The purpose for this linear area is to allow part of this excess power to flow through the chime solenoid if the excess becomes too much. Because of the circuit flipping which turns OFF the LEDs on a button press, and because to this linear area, the maximum power that may be dissipated by the transistor is kept low, allowing a small SMD transistor to be used. Small SMD transistors can dissipate usually 350 mW. To avoid overcoming (or even approaching) this power limit level, if and when required, part of the current is driven through the Mosfet switch to the chime solenoids. Thus, part of the excess current is dissipated from (1) the transistor, (2) part from the Mosfet switch (due to I2R because it operates in the linear area) and (3) part to the solenoids (again I2R).

Although the preferred embodiment has been described in detail, it should be understood that various changes, substitutions and alterations can be made therein without departing from the spirit and scope of the invention as defined by the appended claims.

What is claimed is:

1. An illuminated doorbell chime comprising:
   a main power supply;
   one or more LED lights;
   a chime having a chime coil;
   a circuit having a power supply unit, an LED driver and a chime driver,
   wherein said power supply unit is connected to said one or more LED lights and said chime coil, said LED driver is connected to said one or more LED lights, and said chime driver is connected to said chime coil;
   a door switch connected between said main power supply and said power supply unit of said chime circuit for selectively applying power to said power supply unit;
   said LED driver circuit having a bipolar junction transistor, a base Zener diode, and a voltage divider, wherein a collector of said bipolar junction transistor is connected to said one or more LED lights, an emitter of said bipolar junction transistor is connect to said common through a current limiting resistor, and a base of said bipolar junction transistor is connected to a voltage output of said voltage divider, with said voltage divider having a high end connected to a cathode of said base Zener diode and said voltage divider having a low end connected to said common, and wherein an anode of said base Zener diode is connected to common;
   said chime driver having a Mosfet transistor, a gate resistor, a gate capacitor, and a gate Zener diode, wherein a drain of said Mosfet transistor is connected to said chime coil and said base Zener diode of said LED driver circuit, a gate of said Mosfet transistor is connected to said gate resistor, said gate storage capacitor and an anode of said gate Zener diode, with said gate resistor connector and said gate storage capacitor connected to said common, and wherein said source of said Mosfet transistor is connected to said common; and
   said LED driver and said chime driver being interconnected, with a gate cathode of said gate Zener diode connected to said collector of said bipolar junction transistor, and a cathode of said base Zener diode connected to said drain of said Mosfet transistor, such that said door switch being activated applies supply voltage to said chime coil and said gate of said Mosfet transistor to pass operating current through said chime coil and said Mosfet transistor, and reduces applied voltage to said base of said bipolar junction transistor to turn off said LED lights.

2. The illuminated doorbell chime according to claim 1, further comprising said LED driver having a first LED driver resister connected between said cathode of said base Zener diode and said drain of said Mosfet resistor.

3. The illuminated doorbell chime according to claim 1, further comprising said LED driver having a second LED driver resister connected between said cathode of said base Zener diode and said voltage divider.

4. The illuminated doorbell chime according to claim 1, further comprising said LED driver having third LED driver resister connected between said emitter of said bipolar junction transistor and said common.

5. The illuminated doorbell chime according to claim 1, wherein one or more balancing resistors are connected between respective ones of said one or more LED lights for balancing current flowing through said one or more lights.

6. The illuminated doorbell chime according to claim 1, wherein said voltage divider is a potentiometer having an adjustable resistance for selecting a value for said output current applied to said base of said bipolar junction transistor, such that said output current is varied to adjust the brightness a light output of said one or more LED lights.

7. The illuminated doorbell chime according to claim 1, further comprising said chime driver having a chime driver resistor connected between said gate of said Mosfet transistor and an anode of said gate Zener diode.

8. The illuminated doorbell chime according to claim 1, further comprising said doorbell switch applying a quiescent current through said rectifier to power said LED lights.

9. The illuminated doorbell chime according to claim 8, wherein
a resistor is connected in parallel with said doorbell switch to provide supply current for powering said LED lights when said doorbell is not actuated.

10. An illuminated doorbell chime comprising:
a main power supply;
one or more LED lights;
a chime having a chime coil;
a circuit having a rectifier, an LED driver and a chime driver, wherein said rectifier is connected to said one or more LED lights and said chime coil at a first node, said LED driver is connected to said one or more LED lights at a second node, and said chime driver is connected to said chime coil at a third node;
a door switch connected between said main power supply and said rectifier of said circuit and applying power to said rectifier when said door switch is actuated;
a filter capacitor connected between said rectifier and a common, wherein said filter capacitor is connected to said rectifier at said first node;
said LED driver circuit having a bipolar junction transistor, a base Zener diode, and a voltage divider, wherein a collector of said bipolar junction transistor is connected to said second node and said one or more LED lights, an emitter of said bipolar junction transistor is connect to said common, and a base of said bipolar junction transistor is connected to a voltage output of said voltage divider, with said voltage divider having a high end connected to a base cathode of said base Zener diode and said voltage divider having a low end connected to said common, and a base anode of said base Zener diode connected to said common;
said chime driver having a Mosfet transistor, a gate resistor, a gate storage capacitor, and a gate Zener diode, wherein a drain of said Mosfet transistor is connected to said third node, said chime coil and said base diode, a gate of said Mosfet transistor is connected to said gate resistor, said gate storage capacitor and an anode of said gate Zener diode, with said gate resistor and said gate storage capacitor connected to said common, and wherein said source of said Mosfet transistor is connected to said common; and
said LED driver and said chime driver being interconnected, with a gate cathode of said gate Zener diode connected to said second node and said collector of said bipolar junction transistor, and a base cathode of said base Zener diode connected to said third node and said drain of said Mosfet transistor, such that said door switch being activated applies supply voltage to said chime coil and said gate of said Mosfet transistor to pass operating current through said chime coil and said Mosfet transistor, and reduces applied voltage to said base of said bipolar junction transistor to turn off said LED lights.

11. The illuminated doorbell chime according to claim 10, further comprising said LED driver having a first LED driver resister connected between said second node and said base cathode of said base Zener diode.

12. The illuminated doorbell chime according to claim 10, further comprising said LED driver having a second LED driver resister connected between said base cathode of said base Zener diode and said voltage divider.

13. The illuminated doorbell chime according to claim 10, further comprising said LED driver having third LED driver resister connected between said emitter of said bipolar junction transistor and said common.

14. The illuminated doorbell chime according to claim 10, wherein one or more balancing resistors are connected between respective ones of said one or more LED lights for balancing current flowing through said one or more lights.

15. The illuminated doorbell chime according to claim 10, wherein said voltage divider is a potentiometer having an adjustable resistance for selecting a value for said output current applied to said base of said bipolar junction transistor, such that said output current is varied to adjust the brightness a light output of said one or more LED lights.

16. The illuminated doorbell chime according to claim 10, said chime driver having a chime driver resistor connected between said gate of said Mosfet transistor and an anode of said gate Zener diode.

17. The illuminated doorbell chime according to claim 10, further comprising said doorbell switch applying a quiescent current through said rectifier to power said LED lights, and wherein a resistor is connected in parallel with said doorbell switch to provide supply current for powering said LED lights when said doorbell is not actuated.

18. An illuminated doorbell chime comprising:
a main power supply;
a plurality of LED lights connected in parallel;
a chime having a chime coil;
a circuit having a rectifier, an LED driver and a chime driver, wherein said rectifier is connected to said plurality of LED lights and said chime coil at a first node, said LED driver is connected to said plurality of LED lights at a second node, and said chime driver is connected to said chime coil at a third node;
a door switch connected between said main power supply and said rectifier of said circuit and applying power to said rectifier when said door switch is actuated;
a filter capacitor connected between said rectifier and a common, wherein said filter capacitor is connected to said rectifier at said first node;
said LED driver circuit having a bipolar junction transistor, a base Zener diode, and a voltage divider, wherein a collector of said bipolar junction transistor is connected to said second node and said plurality of LED lights, an emitter of said bipolar junction transistor is connect to said common through a current limiting resistor, and a base of said bipolar junction transistor is connected to a voltage output of said voltage divider, with said voltage divider having a high end connected to a cathode of said base Zener diode and said voltage divider having a base low end connected to said common, and wherein an anode of said base Zener diode is connected to said common;
said chime driver having a Mosfet transistor, a gate resistor, a gate storage capacitor, and a gate Zener diode, wherein a drain of said Mosfet transistor is connected to said third node, said chime coil and said base diode, a gate of said Mosfet transistor is connected to said gate resistor, said gate storage capacitor and an anode of said gate Zener diode, wherein said gate resistor and said gate storage capacitor are connected to said common, and wherein said source of said Mosfet transistor is connected to said common;

said LED driver and said chime driver being interconnected, with a first cathode of said gate Zener diode connected to said second node and said collector of said bipolar junction transistor, and a second cathode of said base Zener diode connected to said third node and said drain of said Mosfet transistor, such that said door switch being activated applies supply voltage to said chime coil and said gate of said Mosfet transistor to pass operating current through said chime coil and said Mosfet transistor, and reduces applied voltage to said base of said bipolar junction transistor to turn off said LED lights;

said LED driver having a first LED driver resister connected between said second node and said base cathode of said base Zener diode;

said LED driver having a second LED driver resister connected between said second cathode of said base Zener diode and said voltage divider;

said LED driver having third LED driver resister connected between said emitter of said bipolar junction transistor and said common;

wherein a plurality of balancing resistors are connected between respective ones of said plurality of LED lights for balancing current flowing through said plurality of lights;

wherein said voltage divider is a potentiometer having an adjustable resistance for selecting a value for said output current applied to said base of said bipolar junction transistor, such that said output current is varied to adjust the brightness a light output of said plurality of LED lights; and said chime driver having a chime driver resistor connected between said gate of said Mosfet transistor and an anode of said gate Zener diode.

19. The illuminated doorbell chime according to claim 18, further comprising said doorbell switch applying a quiescent current through said rectifier to power said LED lights; and wherein a resistor is connected in parallel with said doorbell switch to provide supply current for powering said LED lights when said doorbell is not actuated.

* * * * *